(12) United States Patent
Chiang et al.

(10) Patent No.: US 9,588,001 B2
(45) Date of Patent: Mar. 7, 2017

(54) PRESSURE DETECTING APPARATUS MADE BY 3D PRINTING TECHNOLOGIES BEING ABLE TO BE USED IN DANGEROUS AREAS

(71) Applicant: NATIONAL KAOHSIUNG UNIVERSITY OF APPLIED SCIENCES, Kaohsiung (TW)

(72) Inventors: Chia-Chin Chiang, Kaohsiung (TW); Tso- Sheng Hsieh, Kaohsiung (TW)

(73) Assignee: NATIONAL KAOHSIUNG UNIVERSITY OF APPLIED SCIENCES, Kaohsiung (TW)

( * ) Notice: Subject to any disclaimer, the term of this patent is extended or adjusted under 35 U.S.C. 154(b) by 260 days.

(21) Appl. No.: 14/516,581

(22) Filed: Oct. 17, 2014

(65) Prior Publication Data
US 2016/0109316 A1    Apr. 21, 2016

(51) Int. Cl.
*G01L 9/00* (2006.01)
*G01L 11/02* (2006.01)
*G01M 3/04* (2006.01)

(52) U.S. Cl.
CPC .......... *G01L 11/025* (2013.01); *G01L 9/0007* (2013.01); *G01M 3/047* (2013.01)

(58) Field of Classification Search
CPC ............................... G01L 11/02; G01L 11/025
USPC .......................................................... 73/705
See application file for complete search history.

(56) References Cited

U.S. PATENT DOCUMENTS

2006/0070446 A1*  4/2006  Tam ................. G01L 11/025
                                                      73/705
2010/0158435 A1*  6/2010  Kersey ............... E21B 47/123
                                                      385/13

FOREIGN PATENT DOCUMENTS

| TW | I247101 | * | 1/2006 | ............. G01L 11/02 |
| TW | I309297 | * | 5/2009 | ............. G01N 21/45 |
| TW | I346722 | * | 8/2011 | ............. D01D 1/09 |

OTHER PUBLICATIONS

Li et al. "Embedded Fiber Bragg Grating Sensors in Polymer Structures Fabricated by Layered Manufacturing," 2003.*

* cited by examiner

*Primary Examiner* — Benjamin Schmitt
(74) *Attorney, Agent, or Firm* — Chun-Ming Shih (57) ABSTRACT

A pressure detecting apparatus made by 3D printing technologies being able to be used in dangerous areas is provided. It mainly comprises a light source, a processor, a coupler, and at least one pressure transducer. The pressure transducer comprises a main body and a fiber grating. The fiber grating comprises a fiber Bragg grating sensor, and the fiber grating is fixed on the main body and covers the fiber Bragg grating sensor. When the main body is placed in a fluid area, the fluid would flow through the opening to deform the strain layer and generate a strain variation on the fiber Bragg grating sensor to cause a signal variation in the reflection frequency spectrum. The coupler is configured to couple to the light source and the pressure transducer to decode the signal variation into pressure parameters.

7 Claims, 6 Drawing Sheets

PRESSURE DETECTING APPARATUS MADE BY 3D PRINTING TECHNOLOGIES BEING ABLE TO BE USED IN DANGEROUS AREAS

BACKGROUND OF THE INVENTION

1. Field of the Invention

The present invention is related to a pressure detecting apparatus made by three-dimensional (3D) printing technologies. More particularly, the present invention is related to a pressure detecting apparatus made by 3D printing technologies which is able to be used in dangerous areas.

2. Description of the Prior Art

Fiber is advantaged in thin, light, anti-electromagnetic influence, signal transmission/transduce, and high temperature/cauterization resistance. Its diameter is only from several decades to hundreds micro meters. Fiber has many advantages such as free from electromagnetic influence, low optical power loss, easy to be placed, one line corresponding to multi-points for multi-measurements. Thus fiber measurement technologies are widely accepted. Recently, fiber optic interferometric sensor system is applied to measure tiny variation of many things.

Fiber grating transducer is advantaged in that only the reflection signal of the fiber grating is important when it is connected to control system. The fiber grating has excellent resolution and range, and is water-resist and cauterization-resist. Also, fiber grating can apply measurement by wavelength coding signal.

If a fiber grating is made in a fiber, a fiber grating can be retrieved. Interference would make light propagation in fiber (modulus propagation constant) be influenced and generate another propagation method.

Recently, sensor is directly written into fiber to make a fiber Bragg grating, FBG. Fiber Bragg grating applies Bragg reflection principle. When light passes through area with periodically changed index of refraction, portion of reflection would be generated on each interface. If the period just meets condition of "all added portion of reflections presents as in phase", or a round trip of a light between two reflection surfaces is integer multiple of wavelength, the total reflection ratio would be very close to 100%, even every reflection surface only presents small reflection ratio. That is so-called Bragg condition. It only satisfy particular wavelength, for other wavelengths they would mutually cancel due to out-of-phase. All of this result in high transmission ratio/high reflection ratio conditions.

Conventional fiber grating sensor such as Taiwan patent No. I346772, it is characterized in that it has a circle elastic thin plate and a fiber set under the circle elastic thin plate to transmit signal. The fiber comprises a graded fiber grating pasted on the surface of the circle elastic thin plate, and the center of the graded fiber grating is aligned at the center portion of the circle elastic thin plate. The fiber grating sensor is configured as a displacement-meter. A pole and a spring are connected to the center of the circle elastic thin plate. The displacement of the pole is proportional to the counteractive force generated by the spring. The relation of the counteractive force and the reflection signal of the graded fiber grating is used to determine the displacement. The main disadvantage is that the isolation area and the forced area are completely isolated to protect the sensor, but the physical quantities applied on the circle elastic thin plate would influence sensitivity of the sensor.

A conventional manufacture method of forming a fiber grating sensor for sensing chemical gas is shown in Taiwan patent No. I309297. It is characterized in that a manufacturing method of forming a fiber grating sensor for sensing chemical gas comprising steps of:

(1) preprocess: by high pressure hydrotreating to make an optical single modulus fiber with better sensitivity;
(2) grating process: writing a fiber grating on the preprocessed optical single modulus by phase mask method;
(3) polishing shell: polishing the shell of fiber until it reaches required diameter; and
(4) plating: plating the polished fiber grating to grow a cover layer outside the polished fiber, after a certain plating period of time, washing out acid liquid on the surface of fiber grating by deionized water, and drying the fiber surface by nitrogen.

A conventional pressure sensing device is disclosed in Taiwan patent No. I247101. It comprises a fiber Bragg grating with predetermined length according to different requirement and a side-press pressure sensor. The side-press pressure sensor has a hollow cylinder shell, and two sides of the shell are set with at least one opening. Elastic polymer is stuffed inside the opening of the shell. A hard plate is set on polymer end to ensure that a fiber grating is covered by the polymer and one end thereof is coupled to the hard plate and another end thereof extends outward the shell. The pressure sensing device can be applied to detect pressure, water lever or depth underwater.

Inventor of the present invention realized the aforementioned disadvantages and developed the pressure detecting apparatus made by 3D printing technologies being able to be used in dangerous areas.

SUMMARY OF THE INVENTION

The objective of the present invention is to provide a pressure detecting apparatus made by 3D printing technologies which is able to be used in dangerous areas such as in high temperature, high pressure, or liquid environment.

Another objective of the present invention is to provide a pressure detecting apparatus made by 3D printing technologies which is able to be used in dangerous areas, which can be applied in fiber communication combined with chemical organic materials. Fiber communication is characterized in wide transmission bandwidth, low data signal loss, high reliability, and free from electromagnetic influence, and chemical organic materials are characterized in response sensibility.

Another objective of the present invention is to provide a fiber Bragg grating sensor, which has a center wavelength being able to shift toward short wavelength direction in accordance with increase of pressure. In other words, the center wavelength shift of the fiber Bragg grating sensor appears in negative slop linear relation regarding to pressure variation. The pressure detecting apparatus made by 3D printing technologies being able to be used in dangerous areas applies the fiber Bragg grating sensor for determining compression under loading or pressure to measure the pressure.

The pressure detecting apparatus made by 3D printing technologies being able to be used in dangerous areas mainly comprises: a light source, a processor, a coupler, and at least one pressure transducer. The light source emits detecting optical signal to the pressure transducer, and the coupler interprets the signal variation of the reflection frequency signal from the pressure transducer into pressure parameters and then transmits the parameters to the processor. The pressure transducer comprises:

a main body having a strain layer and at least one opening, wherein the strain layer is set in the longitudinal axis direction of the main body and separates the main body into a first compartment and a second compartment, the opening is formed on a surface in the cross axis direction of the main body to connect to the second compartment;

a fiber grating, wherein the fiber grating comprises at least one fiber Bragg grating sensor, and the two sides of the fiber grating are fixed on the two sides of the center line of the cross axis of the main body, the fiber grating is fixed on the strain layer, and the fiber Bragg grating sensor is located on the fiber grating of the second compartment, the fiber grating covers a portion of the fiber Bragg grating sensor and is formed on the shortest path of two openings, the input of the fiber grating is configured to receive the detecting optical signal emitted from the light source, and the fiber grating is configured to generate the reflection frequency signal to the coupler after receiving the detecting optical signal, the reflection frequency signal is derived from reflection of the detecting optical signal inside the grating of the fiber Bragg grating sensor, when the main body is placed in a fluid region detecting the pressure parameters of the location, the fluid flows through the two openings and generates loading on the strain layer, thus the strain layer deforms and generates a strain variation on the fiber Bragg grating sensor to cause a signal variation in the reflection frequency spectrum.

DETAILED DESCRIPTION OF THE PREFERRED EMBODIMENT

The following descriptions further explain the present invention jointly with drawings.

Figure 1:
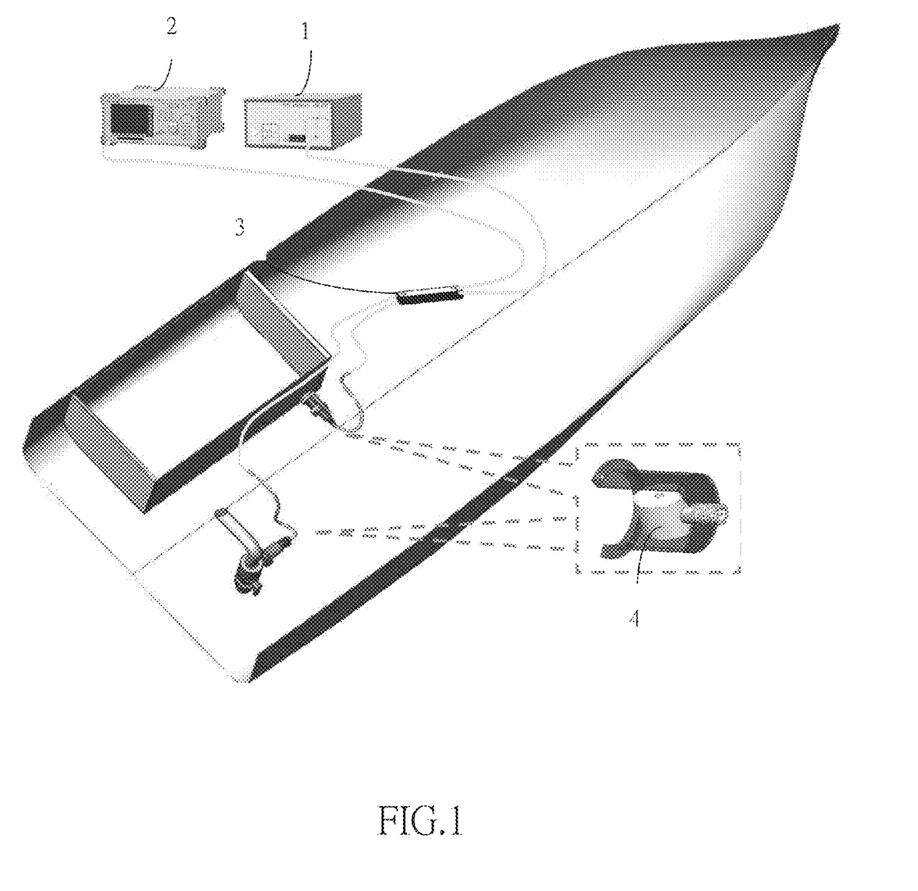
FIG. 1 shows the pressure detecting apparatus made by 3D printing technologies being able to be used in dangerous areas.

Refer to FIG. 1, it shows the pressure detecting apparatus of the present invention made by 3D printing technologies being able to be used in dangerous areas. It mainly comprises a light source 1, a processor 2, a coupler 3, and at least one pressure transducer 4. The light source 1 is connected to the pressure transducer 4 via the coupler 3. The light source 1 would transmit a detecting optical signal to the pressure transducer 4, then the pressure transducer 4 feedbacks a reflection frequency signal to the coupler 3, and the coupler 3 decodes the variation of the reflection frequency signal from the pressure transducer 4 into pressure parameters and then transmits the parameters to the processor 2. The processor 2 can be an optical spectrum analyzer or an optical branching filter. The optical spectrum analyzer is configured to read and present data of the pressure parameters transmitted from the coupler. Or the coupler 3 can transfer the pressure parameters into optical signals and then transmit the optical signals to the optical branching filter, wherein the optical branching filter transmits the optical signals to a plurality of computers or processors for reading and presenting data.

Figure 2:
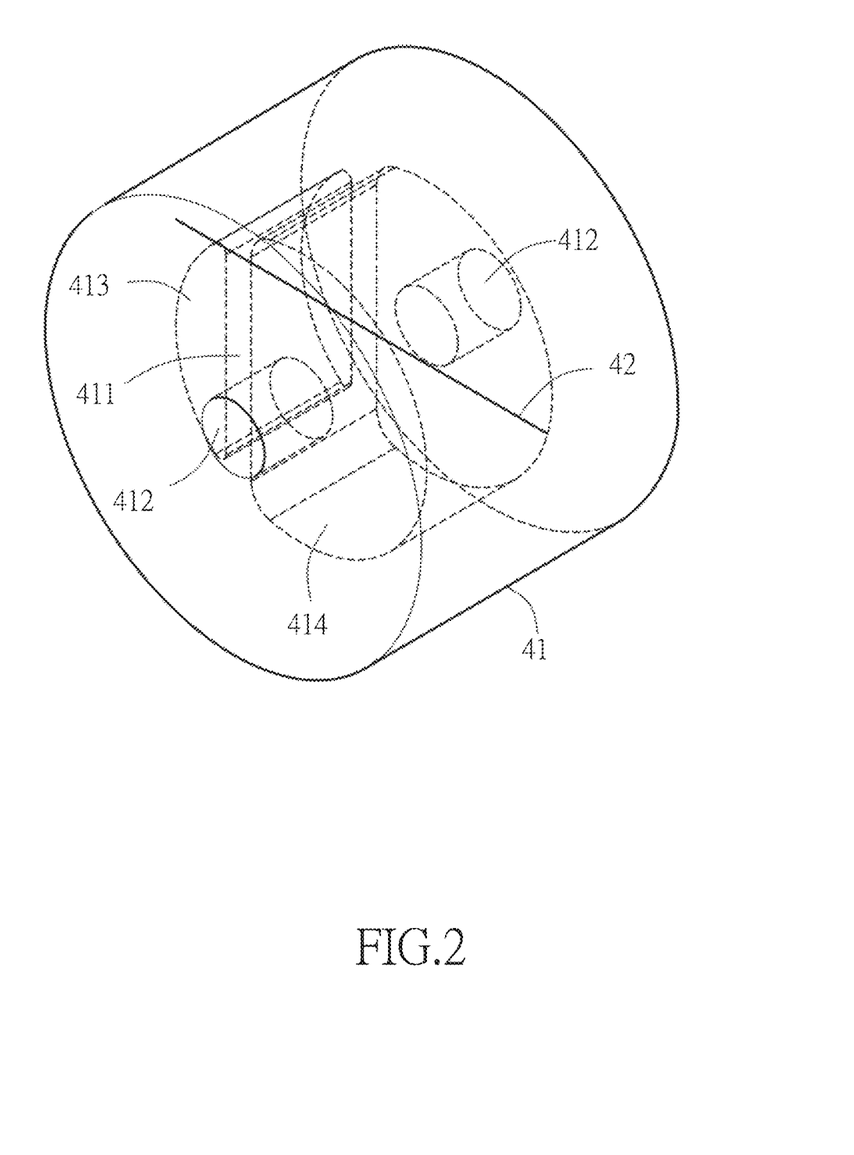
FIG. 2 shows 3D diagram of the pressure transducer.
Figure 3:
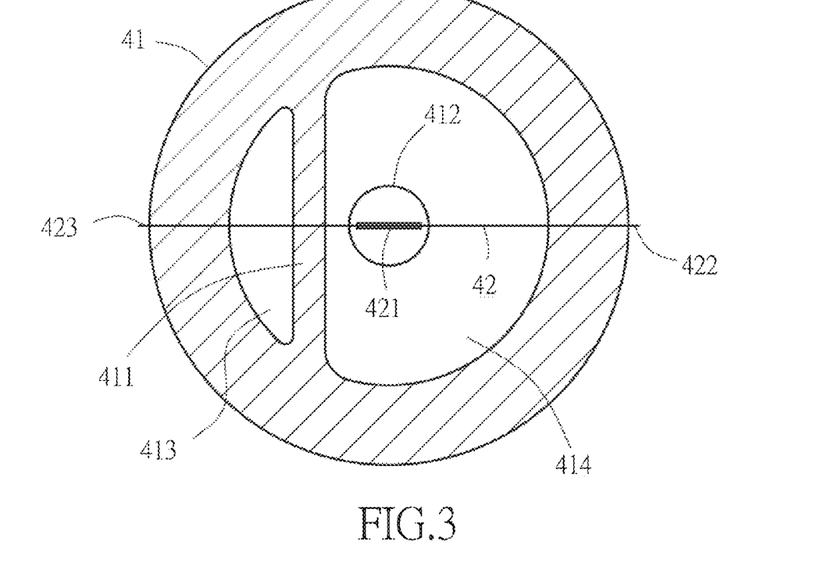
FIG. 3 shows sectional diagram of a cylinder pressure transducer with a fiber Bragg grating sensor fixed on the fiber grating in the second compartment.

The present invention provides a pressure detecting apparatus made by 3D printing technologies, the pressure transducer 4 is able to be used in dangerous areas such as in high temperature, high pressure, or liquid environment. For example, it can be used in detecting fuel storage warehouse, boiler warehouse, generator control room, nature gas engine, and ship fuel system. Also the pressure transducer 4 can be an immersion pressure transducer applied in fuel, effluent water, seawater desalination system, and ballast for liquid detection purposes. Or the pressure transducer 4 can be a differential pressure transducer applied in water, fuel, grease, hydraulic flow, and filter system. Refer to FIG. 2 and FIG. 3, which show the pressure detecting apparatus made by 3D printing technologies being able to be used in dangerous areas. The pressure transducer comprises: a main body 41 and a fiber grating 42.

The main body 41 comprises a strain layer 411 and two through openings 412. The strain layer 411 is set in the longitudinal axis direction of the main body 41 and separates the main body 41 into a first compartment 113 and a second compartment 414. The two openings 412 are respectively formed on two surfaces in the cross axis direction of the main body 41 to connect to the second compartment 414. The main body can be formed by fast formation process, such as 3D printing, Stereo-Lithography, SLA, selective laser sintering, SLS, solider process, SP, fused deposition modeling, FDM, laminated object manufacturing, LOM. The main body 41 is a 3D main body 41 in cylinder or rectangle cube made by bonding materials such as powder plastic according to digital model file. The main body 41 can be formed by layer accumulation process.

The fiber grating 42 comprises at least one fiber Bragg grating sensor 421, and the two sides of the fiber grating 42 are fixed on the two sides of the center line of the cross axis of the main body 41, the fiber grating 42 is fixed on the strain layer 411, and the fiber Bragg grating sensor 412 is located on the fiber grating 42 of the second compartment 414, the fiber grating 42 covers a portion of the fiber Bragg grating sensor 421 and is formed on the shortest path of two openings 412. The present invention is configured to determine the length of the fiber grating 42 according to the strength of pressure needed to be measured. A shorter fiber grating 42 can be selected for less pressure condition, and a longer fiber grating 42 can be selected for higher pressure condition.

The light source 1 can be an optical spectrum analyzer being able to emit a detecting optical signal to one input 422 of the fiber grating 42 and receive a reflection frequency signal. The reflection frequency signal is derived from reflection of the detecting optical signal inside the grating of the fiber Bragg grating sensor 421. When the main body 41 is placed in a fluid region detecting the pressure parameters of the location, the fluid flows through the two openings 412 and generates loading on the strain layer 411, thus the strain layer 411 deforms and generates a strain variation on the fiber Bragg grating sensor 421 to cause a signal variation in the reflection frequency spectrum.

The coupler 3 is configured to couple the light source 1 with the pressure transducer 4. The coupler 3 decodes the variation of the reflection frequency signal into pressure parameters.

In the present invention, powder ABS resin materials are used to make the main body 41 of the pressure transducer 4 by 3D printing technologies. The fiber Bragg grating sensor 421 and the fiber grating 42 are integrated into the main body 41. By designing the strain space of the pressure transducer 41 (such as the first compartment 413, the second compartment 414, or the first compartment 413 and the second compartment 414), thickness of shell, thickness of the strain layer 411, and etc., the strain layer 411 then can deform under air or liquid fluid pressure. Then the fiber Bragg grating sensor 421 can periodically vary to generate spectrum shift, which can be measured.

Figure 5:
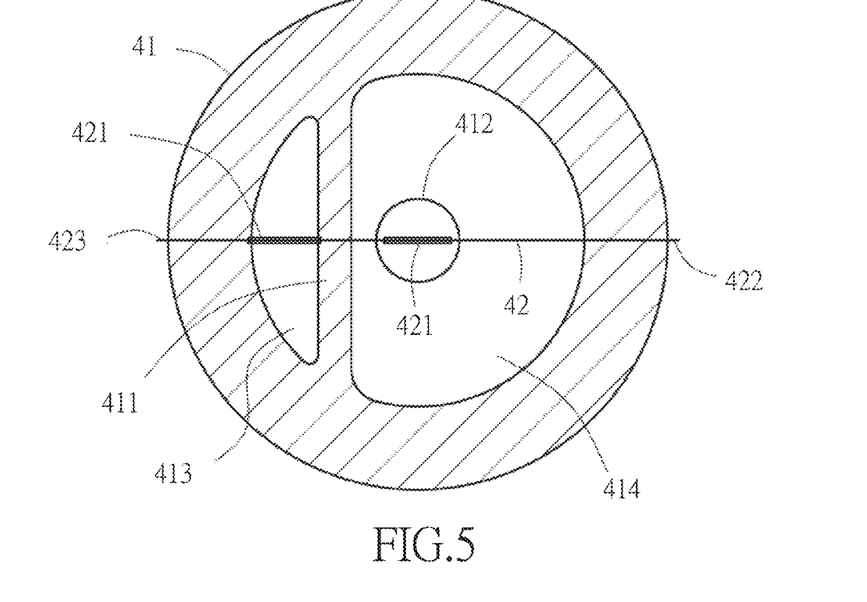
FIG. 5 shows sectional diagram of a cylinder pressure transducer with two fiber Bragg grating sensors fixed on the fiber grating in the first compartment and the second compartment respectively.
Figure 6:
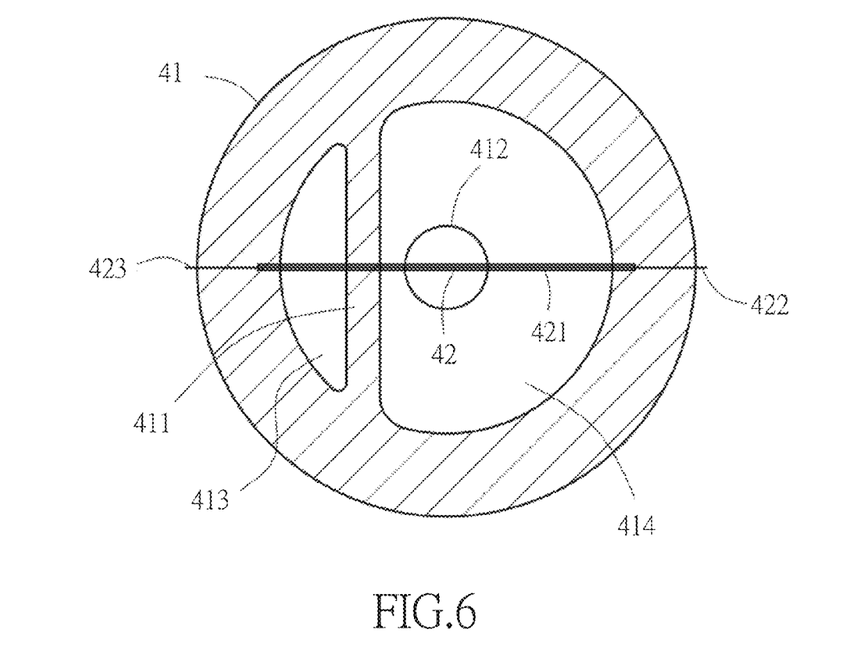
FIG. 6 shows sectional diagram of a cylinder pressure transducer with a fiber Bragg grating sensor integrated on the fiber grating in the first compartment and the second compartment.

Refer to FIG. 3, which shows the fiber Bragg grating sensor 421 set in the second compartment 414 of the main body 41 for measuring the pressure variation of the second compartment 414. Refer to FIG. 5, which shows two fiber Bragg grating sensors 421 respectively set in the first compartment 413 and the second compartment 414 of the main body 41. Refer to FIG. 6, which shows the fiber Bragg grating sensor 421 is integrated with the first compartment 413 and the second compartment 414 of the main body 41. When the fiber Bragg grating sensor 421 in the first compartment 413 is damaged, the input 423 can be rearranged to the input 422, thus the light source 1 can emit a detecting optical signal to the input 423 of the fiber grating 42 to measure the pressure variation in the second compartment 414.

Also, refer to FIG. 5, it is known that the first compartment 413 is smaller than the second compartment 414 of the main body 41 of the embodiment of the present invention. When the strain layer 411 deforms, the first compartment 413 would result in less deformation than the second compartment 414 did, thus the fiber Bragg grating sensor 421 in the first compartment 413 would receive weaker deformation signal than what the fiber Bragg grating sensor 421 in the second compartment 414 received. It is to say that the fiber Bragg grating sensor 421 in the first compartment 413 can be fiber Bragg grating sensor 421 for temperature detection or compensation that requiring less deformation signal.

Figure 7:
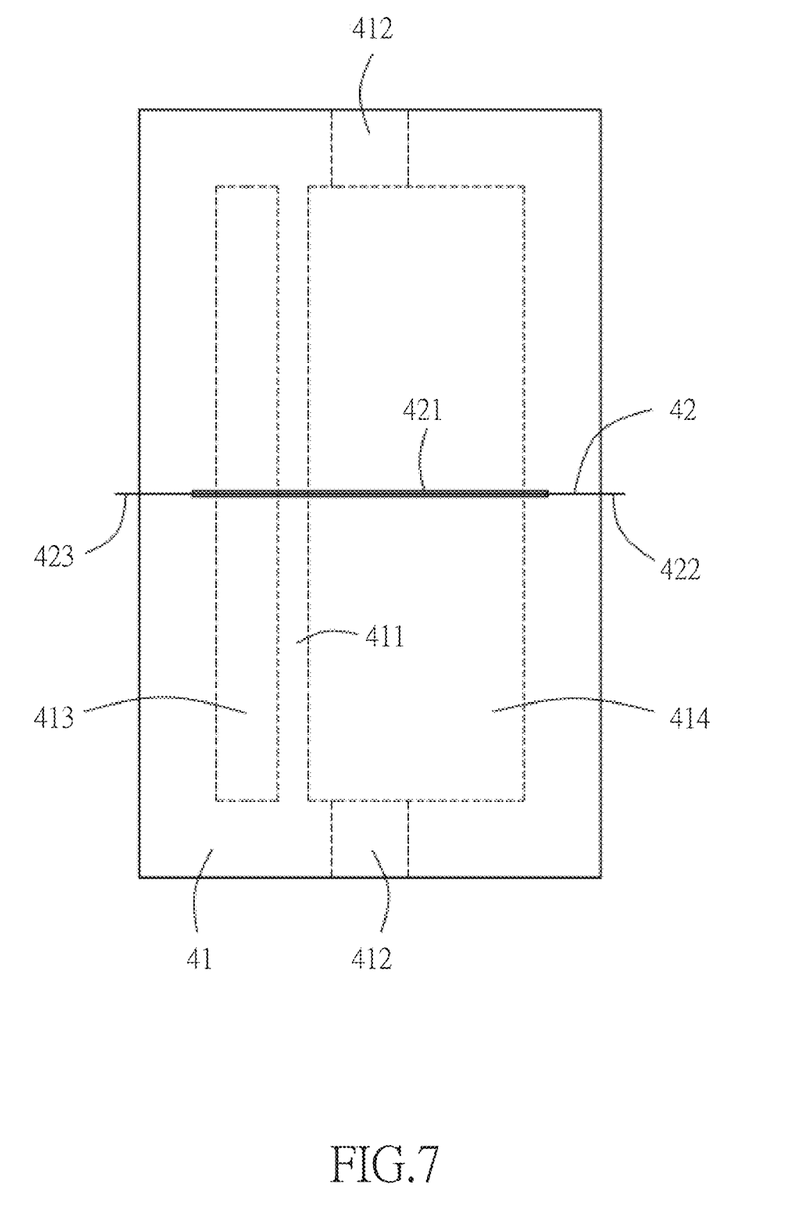
FIG. 7 shows a top-view diagram of the rectangle cube pressure sensing device.
Figure 8:
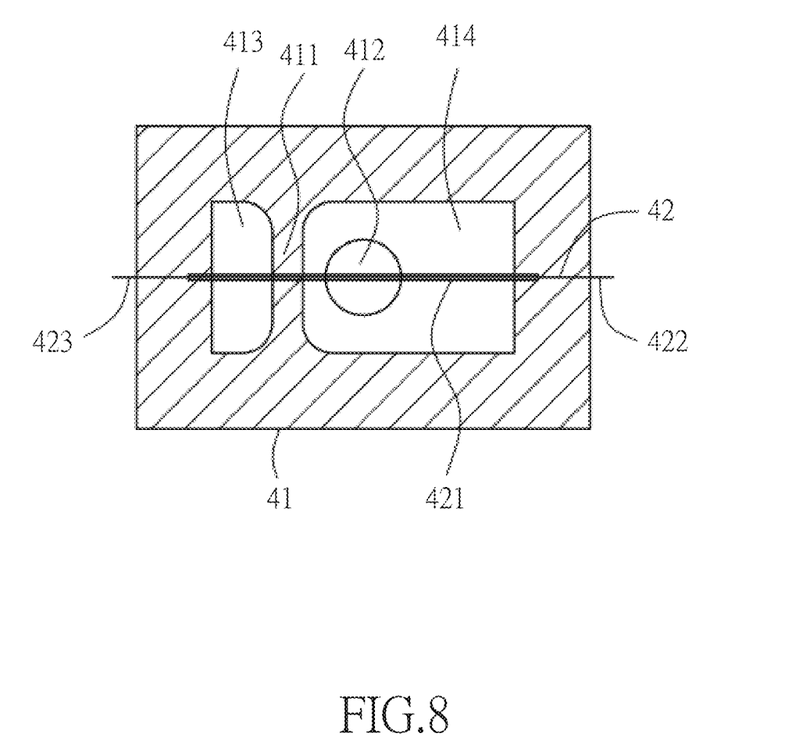
FIG. 8 shows a sectional diagram of the rectangle cube pressure sensing device.

The main body 41 can be made in cylinder or rectangle cube (shown in FIG. 7 and FIG. 8). The main body 41 can be used with light source and optical spectrum analyzer to monitor instant pressure variation in gas or liquid media or acidity and alkaline environment.

The fiber Bragg grating sensor 421 of the present invention has a fiber grating 42. The fiber grating 42 has a core, a shell with relative index of refraction and smaller than the core, and a cover set around the shell for protecting the shell. The core has a grating. When a wideband optical signal enters the core via an input 422 and passes through the grating, only the signal with particular Bragg wavelength satisfying grating character can reflect, the rest of signal with other wavelength would be cancelled by phase difference. Thus, a reflection frequency spectrum satisfying the grating character can be retrieved from the input 422, and a transmission frequency spectrum filtered out portion satisfying the Bragg wavelength can be retrieved from an output 423 opposite to the input 422.

When the fiber grating 42 is influenced by the environment, the pitch of grating changes and result in that the characterized Bragg wavelength of optical signal would shift, thus the fiber Bragg grating sensor 421 can retrieve physical parameters of stress and strain.

Refer to FIG. 3 for further understanding the present invention, it shows a fiber Bragg grating sensor 421 and a main body 41. The fiber Bragg grating sensor 421 can be an uniform fiber Bragg grating 42 (Fiber Bragg Grating, FBG) or other kinds of fiber gratings 42. The length of the fiber grating 42 can be selected according to different strength of reflected light (a shorter fiber grating 42 can be selected for less pressure condition, and a longer fiber grating 42 can be selected for higher pressure condition). The main body 41 has a hollow cylinder shell, and two sides in cross axis direction of the main body 41 are respectively set with at least one opening 412 connecting to outside. A strain layer 411 is set in longitudinal axis direction inside the main body 41 within the opening 412 area. The strain layer 411 can be made of thermoplastic polymers materials with uniform thickness and proper elasticity. The strain layer 411 can bear outside fluid pressure via the opening 412. Thus, a fiber Bragg grating sensor 421 can be formed in the strain layer 411 inside the shell of the main body 41, and the two sides of the fiber grating 42 are fixed on the two sides of the center line of the cross axis of the main body 41, the fiber grating 42 is fixed on the strain layer 411, and the two ends of the fiber grating 42 extend out from the main body 41. Thus the strain of the strain layer 41 caused by radial pressure can result in characterized Bragg wavelength shift of the center of fiber grating 42, and pressure can be measured thereby.

When designing the pressure detecting apparatus made by 3D printing technologies being able to be used in dangerous areas as present invention, the design of the pressure transducer 4 considers relation of characterized Bragg wavelength and pressure of the fiber Bragg grating sensor 421. Particularly, the fiber Bragg grating sensor 421 takes the main body 41 as shell, and is located in center of the main body 41. In 3D space, when the main body 41 is forced or stressed in the longitudinal axis direction of the main body 41 (y direction), there is a pressure along y direction, and the pressure presents as p. ν and E are respectively the Poisson ratio and elastic modulus of the polymer. The pressure p along y direction can cause strain $\epsilon X$, $\epsilon y$, $\epsilon z$ in x, y, z directions respectively. If now a fiber grating 42 with elastic modulus E and a certain cross area is placed on the center axis of the main body 41 along the longitudinal axis direction (y direction), as shown in FIG. 7, and the output 423 of the fiber grating 42 is fixed on center point between the left cross area of the main body 41 and the cross area of the strain layer 411. When a pressure p is applied along the longitudinal axis direction (y direction), a strain would be generated along the cross axis direction (z direction). The force would meanwhile force on the fiber grating 42, the fiber Bragg grating sensor 421, and the main body 41, thus, when the fiber Bragg grating sensor 421 is forced, the main body 41 and the fiber grating 42 should present the same axial strain variation as well.

The fiber grating 42 has an input 422 and an output 423. The fiber grating 42 has a fiber Bragg grating sensor 421. The fiber grating 42 with the fiber Bragg grating sensor 421 is inserted into the second compartment 414 of the main body 41. The grating is to the core of the fiber grating 42. In other case, portion of the fiber grating 42 with the fiber Bragg grating sensor 421 is formed in the second compartment 414 of the main body 41. The present invention takes fiber grating 42 as the fiber Bragg grating sensor 421, and the measured pressure parameters are modified by the coupler 3 and coded by the characterized Bragg wavelength. Thus, the random loss caused by strength variation of the optical signal or hardware bending would not influence measurement accuracy. During measurement, signal shift caused by temperature variation can be compensated by an independent fiber Bragg grating sensor 421 in the same fiber grating 42.

Taking pressure as an example, when fluid flows through the two openings 412, it would cause loading on the strain layer 411, and the pressure in the second compartment 414 in fluid area would cause deformation of the strain layer 411. The fiber Bragg grating sensor 421 would deform as well, and the characterized Bragg wavelength would shift away from the original position. The shift of the characterized Bragg wavelength is proportional to the pressure on the strain layer 411. By applying proper coupler 3 to measure the shift from the reflection of the characterized Bragg wavelength, the pressure on the strain layer 411 can be determined.

Figure 4:
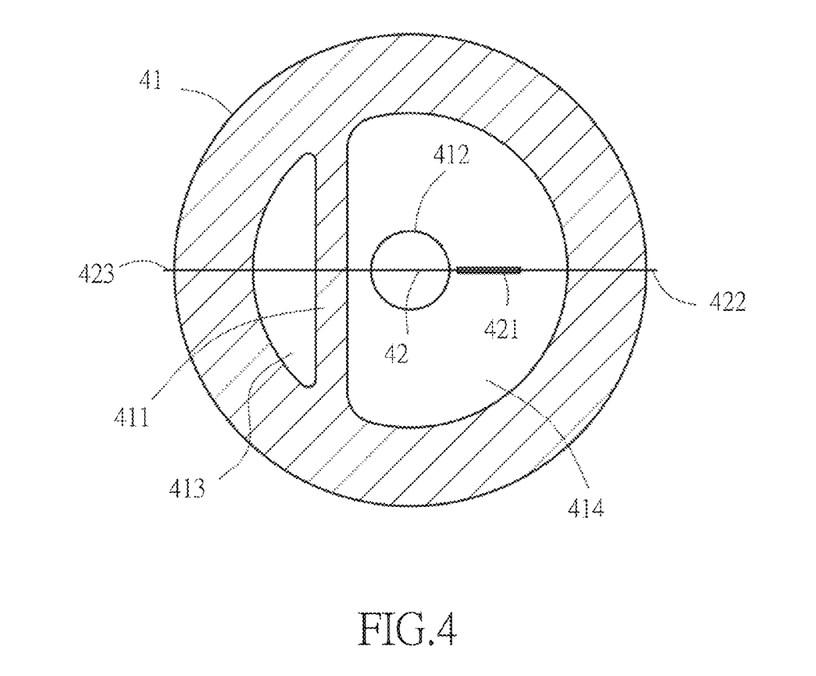
FIG. 4 shows sectional diagram of a cylinder pressure transducer with a fiber Bragg grating sensor away from the neutral axis and fixed on the fiber grating in the second compartment.

Since the strain layer 411 and the fiber grating 42 would deform due to bending stress, the variation caused by the fiber Bragg grating sensor 421 of the fiber grating 42 can be enlarged by moving the sensing area of the sensor away from the neutral axis, i.e. the axis is not extended or compressed under bending variation. Since the fiber Bragg grating sensor 421 is set in the core of the fiber grating 42, the aforementioned status can be achieved by moving the fiber grating 42 away from the two openings along the shortest path. FIG. 4 shows another embodiment, wherein a fiber grating 42 with shifted neutral axis is shown.

The pressure detecting apparatus made by 3D printing technologies being able to be used in dangerous areas has advantages as below when comparing with other conventional technologies.

The pressure detecting apparatus made by 3D printing technologies being able to be used in dangerous areas can be combined with light source and coupler to efficiently measure pressure. Also the present invention is capable of high sensitivity of pressure measurement and can be applied in water level measurement, underwater carrier diving depth measurement, or other high temperature dangerous area measurement.

As aforementioned, the present invention is novel and has many improved advantages comparing with conventional technologies and should be deemed as novel and non-obvious.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A pressure detecting apparatus made by 3D printing technologies comprising:
   a light source, being able to emit a detecting optical signal to at least one pressure transducer;
   a coupler, being able to couple the light source and the pressure transducer for receiving a reflection frequency signal fed back from the pressure transducer and to decode the variation of the reflection frequency signal into a pressure parameter for being transmitted to a processor;
   wherein the pressure transducer comprises:
   a main body having a strain layer and at least one opening, wherein the strain layer is set in the longitudinal axis direction of the main body and separates the main body into a first compartment and a second compartment, the opening is formed on a surface in the cross axis direction of the main body to connect to the second compartment;
   a fiber grating, having an input and an output, wherein the fiber grating comprises at least one fiber Bragg grating sensor, and the two sides of the fiber grating are fixed on the two sides of the center line of the cross axis of the main body, the fiber grating is fixed on the strain layer, and the fiber Bragg grating sensor is located on the fiber grating of the second compartment, the fiber grating covers a portion of the fiber Bragg grating sensor and is formed on the shortest path of two openings, the input of the fiber grating is configured to receive the detecting optical signal emitted from the light source, and the fiber grating is configured to generate the reflection frequency signal to the coupler after receiving the detecting optical signal, the reflection frequency signal is derived from reflection of the detecting optical signal inside the grating of the fiber Bragg grating sensor, when the main body is placed in a fluid region detecting the pressure parameters of the location, the fluid flows through the two openings and generates loading on the strain layer, thus the strain layer deforms and generates a strain variation on the fiber Bragg grating sensor to cause a signal variation in the reflection frequency spectrum.

2. The pressure detecting apparatus made by 3D printing technologies as claimed in claim 1, wherein the fiber Bragg grating sensor is located on the fiber grating of the first compartment, or respectively located in the first compartment and the second compartment.

3. The pressure detecting apparatus made by 3D printing technologies as claimed in claim 1, wherein the fiber Bragg grating sensor is formed in the strain layer inside a shell of the main body, and the two sides of the fiber grating are fixed on the two sides of the center line of the cross axis of the main body, the fiber grating is fixed on the strain layer, and the two ends of the fiber grating extend out from the main body.

4. The pressure detecting apparatus made by 3D printing technologies as claimed in claim 1, wherein the pressure transducer is selected from an immersion pressure transducer, a differential pressure transducer, and a pressure transducer used in detecting fuel storage warehouse, boiler warehouse, generator control room, nature gas engine, and ship fuel system.

5. The pressure detecting apparatus made by 3D printing technologies as claimed in claim 1, wherein the processor is an optical spectrum analyzer being configured to read and present data of the received signal of the coupler.

6. The pressure detecting apparatus made by 3D printing technologies as claimed in claim 1, wherein the processor is an optical branching filter being configured to transmit signals received by the coupler to a plurality of computers or processors for reading and presenting data.

7. The pressure detecting apparatus made by 3D printing technologies as claimed in claim 6, wherein the coupler transfers the received signal to the optical signal and then transmits it to the optical branching filter.

* * * * *